Jan. 15, 1924.

W. T. HIGHT

CASTER CUP

Filed Jan. 15, 1923

1,480,758

Inventor:
William T. Hight,
by Roberts, Roberts & Cushman,
Attys.

Patented Jan. 15, 1924.

1,480,758

UNITED STATES PATENT OFFICE.

WILLIAM T. HIGHT, OF BOSTON, MASSACHUSETTS, ASSIGNOR TO W. T. HIGHT CO., OF BOSTON, MASSACHUSETTS, A CORPORATION OF MASSACHUSETTS.

CASTER CUP.

Application filed January 15, 1923. Serial No. 612,581.

*To all whom it may concern:*

Be it known that I, WILLIAM T. HIGHT, a citizen of the United States of America, and resident of Boston, in the county of Suffolk and State of Massachusetts, have invented new and useful Improvements in Caster Cups, of which the following is a specification.

This invention relates to improvements in caster cups such as are commonly employed for preventing injury to finished floors by the continued pressure of the casters of heavy pieces of furniture which occupy substantially the same position for long periods. As usually made the caster cup consists of a circular or polygonal block or thick disk of glass, porcelain, wood, or the like of such diameter as to provide an extended bearing surface on the floor and having a shallow saucer-like cavity in its upper face in which the caster rests and whose rim portion is intended to prevent the caster from rolling off the block. Heretofore there has apparently been no appreciation of the existence of any functional relationship between the size of the cavity and the dimensions of the caster roll and for economy in material and ease in manufacture the cavity has usually been made of large diameter as compared with that of the caster roll so that when resting in the cavity, the roll is free to move to a greater or less extent diametrically of the cup before it comes into engagement with the cup's rim. When the caster supports a heavy piece of furniture, this freedom of movement permits the development of momentum sufficient to carry the caster roll up over the rim of the cup when the piece of furniture is subjected to lateral pressure great enough to start it into motion. If the roll escapes from the cup it descends abruptly to the floor and the sudden blow thus produced often results in damage to the caster and injury to the floor, while the escape of the caster from the cup necessitates the somewhat difficult task of lifting the piece of furniture back to its initial position with the caster rolls in their respective cups. Such movement of the caster roll transversely of its cup and the abrupt contact of the roll with the rim of the cup, particularly if the caster has become rusty so that the roll cannot climb easily over the rim, often results in breaking or chipping the cup, and furthermore, the large cavity soon becomes unsightly from the collection of dust which can be removed only with difficulty.

The object of the invention is accordingly to provide a caster cup of such character that when seated therein the caster roll is positively prevented from moving relatively of the cup to any substantial extent while the collection of dust within the cup cavity is minimized and cleaning of the cup facilitated.

To this end the cup is preferably formed as a short cylinder having a flat upper surface in which is provided a substantially rectangular cavity having abrupt sides, the dimensions of the cavity being such that the caster roll will fit snugly therein. For use with small casters the depth of the cavity is made approximately one half the diameter of the caster, and in such cases the sides of the cavity are recessed at their upper edges to accommodate the ends of the roller supporting arms and the heads of the pin upon which the roll turns, but with rolls of large diameter where the depth of the cavity is relatively less, such recesses are unnecessary as in this case the axis of the roll lies above the upper face of the cup. In the accompanying drawings a prefered embodiment of the invention is illustrated by way of example, and in such drawings:

Figure 1:
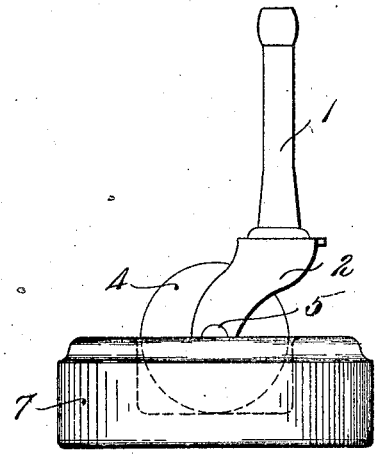
Fig. 1 is a side elevation of the device forming the subject-matter of the present invention showing a caster of ordinary form associated therewith.
Figure 3:
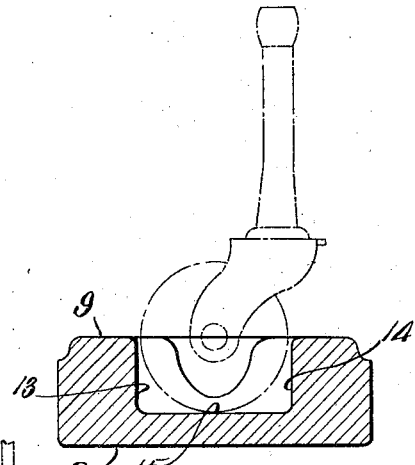
Fig. 3 is a diametral cross section on the line 3—3 of Fig. 2 showing the caster in broken lines.
Figure 4:
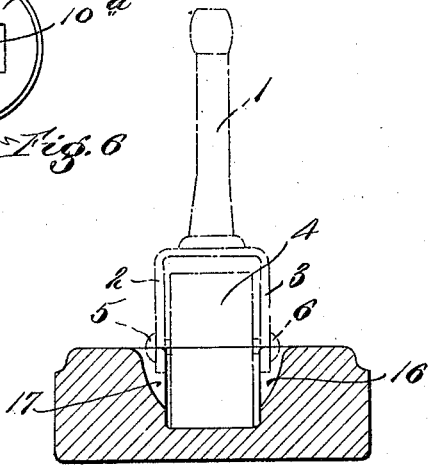
Fig. 4 is a diametral cross section on the line 4—4 of Fig. 2 also showing the caster in dotted lines.

Referring to Figs. 1 and 4, a caster is illustrated comprising the spindle 1 and the spaced arms 2, 3 between which the roller 4 is mounted to turn upon a pin connecting the arms, the opposite ends of this pin being headed over at 5, 6 respectively to retain the parts in assembled relation. The caster thus described is of ordinary and usual construction and forms no part of the present invention.

The caster cup forming the immediate subject-matter of the present invention is herein illustrated as comprising a short cylinder 7 which may be made of glass, metal, wood or other suitable material having the flat lower surface 8 intended to rest upon the floor and of a diameter to provide a substantial bearing surface to support the weight of any article of furniture which would ordinarily be placed thereon without indenting the floor. This cylinder or disk has a substantially flat and horizontal upper surface 9 in which a cavity 10 is provided. The cavity as herein shown is of substantially rectangular contour comprising the side walls 11, 12 and the end walls 13, 14. These walls are substantially vertical and terminate at the bottom wall 15 of the cavity. The outline of the cavity thus formed is substantially that of the projection of the roller 4 upon the upper surface 9 of the block or disk, or stated in other words, the width of the cavity is substantially equal to the width of the roller and its length is substantially equal to the diameter of the roller. Preferably also the depth of the cavity, that is the distance between the plane of the upper surface 9 and the plane of the bottom wall 15 is substantially equal to one half the diameter of the roller, so that when the roller rests upon the bottom surface 15 its axis lies in the plane of the upper surface 9. To permit the roller thus to rest upon the bottom 15 of the cavity, it is necessary to provide recesses 16, 17 in the upper edges of the side walls 11, 12 respectively of the cavity to accommodate the lower ends of the arms 2, 3 of the caster and also the projecting ends 5, 6 of the journal pin. The roller thus fits snugly within the cavity so that any relative movement of the caster and the cup is substantially prevented. With this arrangement it is not possible to develop sufficient momentum in the article of furniture supported by the caster to carry the caster roll up out of the cavity in the cup, the abrupt vertical sides of this cavity assisting in preventing the roller from jumping out of the cavity. The cup thus provided in large measure prevents accidental escape of the caster roller, while the snug fit of the roller in the cavity prevents the settling of dust within the cavity where it is difficult to remove it, while on the other hand as the upper surface of the cup is substantially smooth and flat, dust may readily be removed therefrom.

As above pointed out, it is desirable to have the caster roll set down into the cavity to the depth shown in the drawings, but it is not necessary that the cavity be of this exact relative depth provided the dimensions of the cavity be such as to prevent any substantial movement of the caster relatively to the cup. When the caster is furnished with a roll substantially larger relatively to the depth of the cup than that herein shown, it may not be necessary to furnish the recesses 16, 17 in the cup, as in such case the axis of the roller and the lower ends of the supporting arms would lie above the upper surface of the cup.

Figure 5:
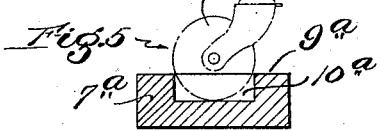
Fig. 5 is a cross section, similar to Fig. 3, but to smaller scale, illustrating a modified form of the device.
Figure 6:
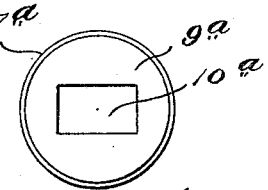
Fig. 6 is a plan view of the device shown in Fig. 5, the caster being omitted.
Figure 2:
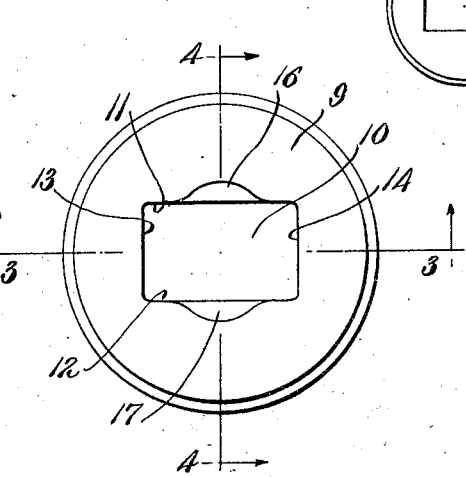
Fig. 2 is a plan view of the device, the caster being omitted.

Such an arrangement is illustrated in Figs. 5 and 6 wherein the cup 7$^a$ is shown as having the upper surface 9$^a$ provided with the cavity 10$^a$. This recess, while of rectangular contour and of a width substantially equal to that of the caster roller 4$^a$ is of less length than the diameter of the roller so that when resting upon the bottom of the recess the lower ends of the roller supporting arms terminate above the plane of the surface 9$^a$. No recesses in the side walls of the cavity are necessary in this case and they may therefore be omitted as indicated in Fig. 6. Although the present invention is intended primarily for use with casters having rollers, it is evident that in certain of its aspects it might well be applied to casters of other types, providing the cavity in the cup be of the proper dimensions to receive the corresponding part of the caster snugly and to prevent relative movement of the parts. As herein illustrated the cup has been shown as of circular outline, but the exact outline or configuration of the outer surface of the cup forms no essential part of the invention, and it is contemplated that various ornamental forms may be employed, and that the cups may be made of different sizes to accommodate the commercial sizes of casters.

I claim:

1. A caster cup having a caster recess shaped to prevent a caster from sliding or rolling out of the cup, the cup being formed of a solid block of material and the recess having integral upright side walls closely confining the caster on both sides, lateral and angular movement of the caster relative to the cup being restrained by engagement between the sides of the caster and said upright walls.

2. A caster cup formed of a solid block of material and having an oblong caster recess, the recess having integral upright side walls closely confining the caster on both sides, said upright side walls engaging the sides of the caster to prevent substantial lateral or angular movement of the caster relatively to the cup, whereby the caster is restrained from sliding or rolling out of the cup.

3. A caster cup formed of a solid block of material and having a caster recess, the recess having integral upright side walls closely confining the caster on both sides, said upright side walls engaging the sides of the caster to prevent substantial lateral or angular movement of the caster relatively to the cup, and said upright side walls flaring outwardly at the center to accommodate the caster bearing.

Signed by me at Boston, Massachusetts, this 6th day of January, 1922.

WILLIAM T. HIGHT.